United States Patent
Entenmann

(10) Patent No.: US 9,939,915 B2
(45) Date of Patent: Apr. 10, 2018

(54) CONTROL DEVICE AND METHOD FOR CONTROLLING FUNCTIONS IN A VEHICLE, IN PARTICULAR A MOTOR VEHICLE

(71) Applicant: DAIMLER AG, Stuttgart (DE)

(72) Inventor: Volker Entenmann, Affalterbach (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 15/508,526

(22) PCT Filed: Jul. 1, 2015

(86) PCT No.: PCT/EP2015/001325
§ 371 (c)(1),
(2) Date: Mar. 3, 2017

(87) PCT Pub. No.: WO2016/034256
PCT Pub. Date: Mar. 10, 2016

(65) Prior Publication Data
US 2017/0277271 A1    Sep. 28, 2017

(30) Foreign Application Priority Data

Sep. 5, 2014    (DE) .......................... 10 2014 013 763

(51) Int. Cl.
*G06F 3/01* (2006.01)
*B60K 37/06* (2006.01)
*G06F 3/03* (2006.01)

(52) U.S. Cl.
CPC .............. *G06F 3/017* (2013.01); *B60K 37/06* (2013.01); *B60K 2350/1052* (2013.01); *B60K 2350/2013* (2013.01); *G06F 3/0304* (2013.01)

(58) Field of Classification Search
CPC ....... G06F 3/017; G06F 3/0304; B60K 37/06; B60K 2350/1052; B60K 2350/2013
See application file for complete search history.

(56) References Cited

U.S. PATENT DOCUMENTS

2010/0066676 A1*  3/2010  Kramer ................... G06F 3/017
                                                                   345/158
2013/0076615 A1   3/2013  Iao
(Continued)

FOREIGN PATENT DOCUMENTS

DE    102012000263 A1    7/2013
EP         2323019 A1    5/2011
(Continued)

OTHER PUBLICATIONS

International Search Report dated Dec. 10, 2015 in related International Application No. PCT/EP2015/001325.
(Continued)

*Primary Examiner* — Richard M Camby
(74) *Attorney, Agent, or Firm* — Patent Portfolio Builders PLLC

(57) ABSTRACT

An operation device and a method for operating functions of a vehicle involve a gesture detection device allowing detection of gestures carried out by a person in an interior of the vehicle for operating the functions. The gesture detection device has a multitude of operation zones in the interior, each zone being allocated to one of the functions and being selectable for operating the respective function by a gesture allocated to the respective operation zone.

13 Claims, 1 Drawing Sheet

(56) References Cited

U.S. PATENT DOCUMENTS

| | | | |
|---|---|---|---|
| 2013/0154298 A1 | 6/2013 | Ricci | |
| 2014/0285217 A1* | 9/2014 | Van Gastel | B60R 25/2054 |
| | | | 324/658 |
| 2014/0309878 A1* | 10/2014 | Ricci | H04W 48/04 |
| | | | 701/36 |
| 2014/0361989 A1 | 12/2014 | Entenmann et al. | |
| 2016/0214573 A1* | 7/2016 | Lagabe | B60R 25/245 |
| 2017/0024106 A1* | 1/2017 | Wild | G06F 3/0482 |

FOREIGN PATENT DOCUMENTS

| | | |
|---|---|---|
| EP | 2741171 A1 | 6/2014 |
| EP | 2930603 A1 | 10/2015 |

OTHER PUBLICATIONS

Written Opinion dated Dec. 10, 2015 in related International Application No. PCT/EP2015/001325.
Office Action dated Dec. 19, 2017 in related EP Application No. 15 734 070.4-1762 (references US 2013/154298 and EP 2 323 019 previously cited in IDS on Mar. 3, 2017).

* cited by examiner

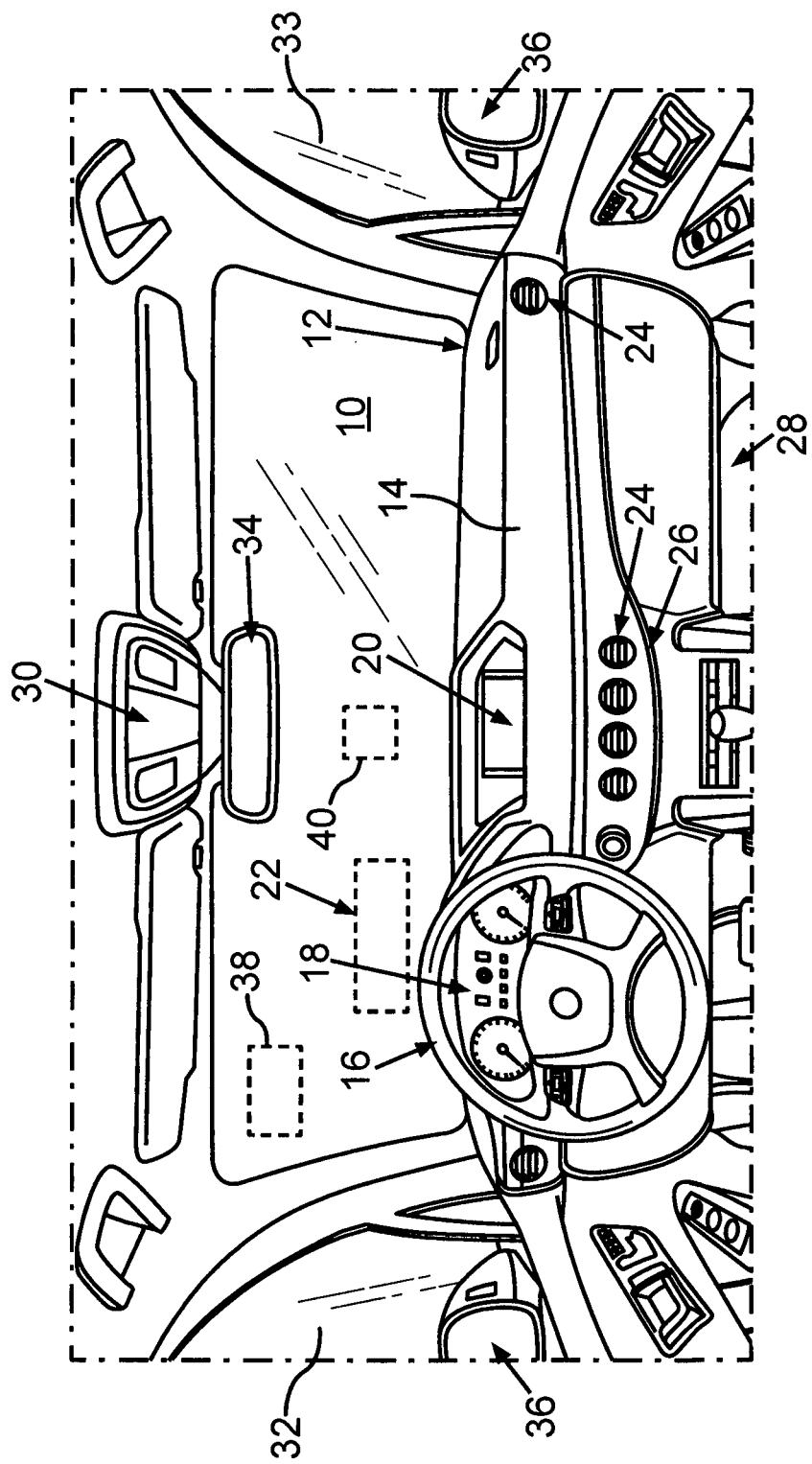

CONTROL DEVICE AND METHOD FOR CONTROLLING FUNCTIONS IN A VEHICLE, IN PARTICULAR A MOTOR VEHICLE

BACKGROUND AND SUMMARY OF THE INVENTION

Exemplary embodiments of the invention relate to an operating device for operating functions of a vehicle and a method for operating functions of a vehicle.

An operating device and such a method for operating functions of a vehicle, in particular of a motor vehicle, such as a passenger motor vehicle for example, are already known from German patent document DE 10 2012 000 263 A1. The operating device thus comprises a gesture detection device allowing gestures carried out by a person in an interior of the vehicle to operate the functions to be detected. In the scope of the method, gestures carried out in the three-dimensional space are thus used to operate the functions.

A first step of the method determines whether or not a first gesture carried out in the three-dimensional space is detected by means of an image-based detection procedure. If the first gesture has been detected, a second step determines whether or not the first gesture is a gesture allocated to the activation of a controlling of a function. If it is determined that the detected first gesture is the gesture allocated to the activation of the controlling of a function, activation of the control of the function is performed in a third step. A fourth step determines whether or not a second gesture carried out in the three-dimensional space is detected by means of the image-based detection procedure. If the second gesture is detected, a fifth step determines whether or not the detected second gesture is a gesture allocated to controlling the function. Finally, in a sixth step, the function is controlled if it has been determined that the detected first gesture is the gesture allocated to activating the controlling of the function, and if it is determined that the detected second gesture is the gesture allocated to controlling the function.

Exemplary embodiments of the present invention are directed to an operating device and a method of the type cited above, by means of which a particularly ergonomic and comfortable operation of the functions can be achieved.

According to an exemplary embodiment an operating device providing a particularly ergonomic and comfortable operation of the functions includes a gesture detection device having a multitude of operation zones in the vehicle interior, which are respectively allocated to the functions and are able to be selected to operate the respective function by means of a gesture allocated to the respective operation zone. Thus, it is possible to achieve a universal gesture operation by which different functions can be controlled from any location and thus also from the same location in the interior. For this purpose, to operate one of the functions, the operation zone allocated to this one function is selected by a person in the interior carrying out the gesture allocated to this operation zone. After selecting the operation zone, the function allocated to the selected operation zone can subsequently be operated.

Thus, it is possible to select the respective operation zone out of the different locations of the interior such that the person can operate the respective function in a particularly simple and comfortable manner. The operating device according to the invention thus enables a universal gesture operation concept for numerous vehicle functions and is able to be extended at will, such that a particularly high number of functions can also be operated in a simple manner without a corresponding multitude of operating elements such as buttons and/or switches for example having to be provided in the interior for this purpose.

To detect the respective gesture and thus to detect which of the operation zones is selected, the gesture detection device comprises at least one or several cameras for example, which are formed as 3D cameras, for example. Such a camera can be a stereo camera or a time-of-flight camera. This respective 3D camera is formed to detect at least one part of the interior and thus at least one part of the person in the interior in three dimensions. Head, arm, hand, and/or finger movements and positions, for example, of the people can then be detected by a corresponding image processing and, for example, intersections of pointing directions with operating zones can be calculated, so that the respective gesture can subsequently be detected.

It has proved to be advantageous when the person, during the respective gesture for selecting the respective operation zone, points to the respective operation zone with one finger, in particular the index finger, of one hand of the person. In other words, it is preferably provided that the respective operation zone can be selected in such a way that the person points to the respective operation zone that the person wishes to select with one of their fingers, in particular their index finger. Thus, the respective operation zone can be selected by a particularly simple and natural gesture.

Activating the respective operation zone is to be understood to be selecting the respective operation zone. Because of selecting, i.e., activating, the respective operation zone, the function allocated to the selected or activated operation zone can subsequently be operated.

It has thus proved to be particularly advantageous if the respectively selected operation zone remains selected as long as the wrist of the hand stays in a region after carrying out the gesture, the region being able to be predetermined. Thus, the person can operate the selected function as long as the operation zone is selected.

A further embodiment involves deactivating the selected operation zone by moving the wrist out of the region. By doing so, the initially selected, i.e., activated operation zone can be deactivated such that the corresponding function can no longer be operated. Subsequently, a different operation zone can be activated or selected in order to subsequently operate the function allocated to the other operation zone.

To achieve a particularly simple operation, the function allocated to the selected operation zone can be operated by moving the hand and/or at least one finger of the hand of the wrist that is still in the predetermined region. Micro-gestures for operating the function emerge automatically because the wrist must remain in the predetermined region during the actual operation of the function, i.e., during the actual functional controlling, wherein these micro-gestures are ergonomically efficient and thus particularly comfortable.

The invention is based on the knowledge that the operation of functions by a person, in particular the driver of the vehicle, during autonomous driving presents a new challenge since, during autonomous driving, the driver can sit relaxed in his seat and does not have to touch or hold a steering handle such as a steering wheel of the vehicle, for example, with his hands. The steering wheel thus moves either autonomously and/or is moved away, i.e., removed from the driver such that the driver can no longer hold the steering wheel. Thus, operation elements provided on the steering wheel are no longer available or accessible to the driver such that the driver can no longer operate the functions of the vehicle via the operation elements provided on the steering wheel.

Thus, it is desirable to provide an opportunity for the driver to operate the functions of the vehicle in a simple and comfortable manner and thus to be able to comfortably operate menu systems, for example on an instrument cluster, a head-up display, and/or a central display. The same desire of course also exists with regards to operating further vehicle functions. This desire can be fulfilled by means of the operation device according to the invention because the driver does not need the operation elements provided on the steering wheel in order to operate the functions. Thus, in the described manner, the driver can ergonomically and comfortably operate the respective functions by carrying out the gestures, in particular three-dimensional gestures. In doing so, the gestures are preferably formed as body gestures that the driver can carry out with his body.

Exemplary embodiments of the invention also involve a method for implementing a particularly ergonomic and comfortable operation of the functions. The gesture detection device has a multitude of operation zones in the interior, which are respectively allocated to one of the functions and are selected, i.e., activated, for operating the respective function by means of a gesture allocated to the respective operation zone. Advantageous embodiments of the operation device according to the invention are to be considered as advantageous embodiments of the method according to the invention and vice versa.

Further advantages, features and details of the invention arise from the description of a preferred exemplary embodiment below, as well as with the aid of the FIGURE. The features and feature combinations cited in the description above and below in the description of the figures and/or shown in the FIGURE alone can be used not only in each specified combination, but rather also in other combinations or individually, without exceeding the scope of the invention.

BRIEF DESCRIPTION OF THE DRAWING FIGURE

The sole Fig. sectionally illustrates a schematic depiction of a cockpit arranged in an interior of the vehicle having an operation device for operating functions of the vehicle, wherein the operation device comprises a gesture detection device by means of which gestures carried out by a person in the interior are able to be detected for operating the functions.

DETAILED DESCRIPTION

The sole Fig. sectionally illustrates, in a schematic depiction, an interior 10 of a vehicle, the vehicle being a motor vehicle in the form of a passenger motor vehicle. A cockpit 12 is arranged in the interior, the cockpit 12 comprising an instrument panel 14 and a steering handle in the form of a steering wheel 16. A person located in the interior 10, in particular the driver of the passenger motor vehicle, can steer the passenger motor vehicle via the steering wheel 16, It is further possible that the passenger motor vehicle has an autonomous driving function, in the scope of which the passenger motor vehicle can be autonomously or automatically driven without the assistance of the driver.

A multitude of components of the passenger motor vehicle is arranged in the interior 10, each of the components being able to perform and thus carry out at least one function. One of these components is an instrument cluster 18, for example, which comprises at least one display element. The function of the instrument cluster 18 is to display values that characterize the current driving state of the passenger motor vehicle. These values are, for example, the current driving speed of the rotational speed of a drive unit for powering the passenger motor vehicle. A further component is a central display 20 that, for example, has the function of displaying further information such as a map of the surroundings of the passenger motor vehicle, for example. The passenger motor vehicle further comprises a head-up display 22, air outflow nozzles 24, an air conditioning operation device 26, a glove compartment 28, a roof operation unit 30, side windows 32, 33, an interior mirror 34 and exterior mirror 36 as further components.

All these components have at least one function, wherein these functions can be operated, i.e., activated and deactivated for example, by the driver. As part of the operation of the function of the central display 20, the central display 20 can be activated or deactivated, for example. As part of the operation of the function of the air conditioning operation device 26, the driver can adjust a temperature of air, for example, that is emitted from the air outflow nozzles 24 into the interior 10. Alternatively or additionally, it is possible as part of the operation of the function of the air conditioning operation device 26 to adjust fan strength and thus the volume flow of the air emitted from the air outflow nozzles 24. As part of the operation of the function of the side windows 32, 33 it is possible, for example, to move the side windows 32, 33 in the vertical direction of the vehicle and to thus open or close them.

Overall, it can be recognized from the sole Fig. that the passenger motor vehicle has a multitude of components and thus a multitude of functions that can be operated by the driver. In order to achieve a particularly ergonomic and comfortable operation of the functions, an operation device (not illustrated in sole the Fig.) is provided for operating the functions. The operation device comprises a gesture detection device, by means of which gestures carried out in the interior 10 by a person, in particular the driver, are able to be detected for operating the functions. To this end, the gesture detection device has a camera, for example, in particular a 3D camera, by means of which at least one part of the interior 10 and the driver are detected. Respective images detected by the camera undergo an image processing procedure by means of which the respective gestures are detected.

The gesture detection device now has a multitude of operation zones in the interior 10, which are allocated in each case to one of the functions and are able to be selected for operating the respective function by means of a gesture allocated to the respective operation zone. Presently, two of the operation zones labeled with 38 or 40 are shown in the sole Fig. Of course, more than two operation zones can be provided. For example, the operation zone 38 is allocated to the function of the side window 32, wherein the operation zone 40 is allocated to the function of the central display 20. If the driver wants to operate the central display 20, for example, or the functions of it and thus activate or deactivate the central display 20, for example, then the driver selects the operation zone 40. As a result of selecting the operation zone 40, the driver can then operate the central display 20 or the function of it, wherein the driver can activate or deactivate the central display 20, for example.

If the driver wants to operate the side window 32 or the function of it, for example, then the driver selects the operation zone 38. As a result of selecting the operation zone 38, the driver can then operate the side window 32 or the function of it, wherein the driver can open or close the side window 32, for example.

To achieve the operation of the respective function, a so-called point-and-control operation is thus provided. Each of the operation zones 38 and 40 can be selected by the driver in such a way that the driver points with one of his index fingers to the operation zone 38 or 40 to be selected.

If the driver points with one of his index fingers to the operation zone 40, then the operation zone 40 is selected, i.e. activated. However, if the driver points with his index finger to the operation zone 38, then the operation zone 38 is selected, i.e., activated. By doing so, the respective operation zone 38 or 40 is selected when the driver points with his index finger to the respective operation zone 38 or 40 and remains for a predetermined, short period of time in this position.

Activating or selecting the respective operation zone 38 or 40 is preferably optically and/or acoustically reported back, such that it can clearly be communicated to the driver whether the desired operation zone 38 or 40 has been selected. The selected operation zone 38 or 40 remains activated for as long as the position of a wrist is not significantly changed. In other words, the driver has to point to the corresponding operation zone 38 or 40 to select the respective operation zone 38 or 40 whereto he moves his hand and thus his wrist into a corresponding position and remains in this position. The selected operation zone 38 or 40 remains selected as long as the wrist of the hand remains in a predetermined region. A clear change of position of the wrist leads to deactivating the initially selected operation zone 38 or 40. In other words, if the driver moves his hand out of the predetermined region, then the previously selected operation zone 38 or 40 is deactivated. This selecting of the respective operation zone 38 and 40 is a so-called point-step in the scope of the point-and-control operation.

A control step connects to the point step, within the framework of which control step the function subsequently operates, i.e., is controlled. An activated, i.e., selected operation zone can be operated by finger and/or hand movements from the wrist, for example upwards and downwards in the vertical direction of the vehicle and to the left and right in the transverse direction of the vehicle. The condition concerning this is that the position of the wrist remains virtually the same, i.e., that the wrist remains in the predetermined region.

After activating the respective operation zone 38 or 40, the first finger and/or hand movement from a resting position determines an operation direction that remains locked or determined until achieving a further resting position and then, i.e., on achieving the further resting position, is approved again. By doing so, a four-way operation can be presented that is preferably extended by a confirmation gesture or an OK gesture and by a cancel gesture or back gesture, in order to confirm or cancel or leave the desired operation.

The point-and-control operation provides a universal feature operation concept for numerous functions of the passenger motor vehicle, which can be extended as required. Selecting or activating the respective operation zone 38 or 40 by pointing with the index finger is a natural gesture that can be carried out in a simple, ergonomic and comfortable manner. By holding the wrist as required during the actual controlling or operation of the function, micro-gestures appear automatically that are ergonomically efficient and thus comfortable.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An operation device for operating functions of a vehicle, the operating device comprising:
    a gesture detection device, which detects gestures carried out by a person in an interior of the vehicle, wherein the gestures operate the functions,
    wherein the gesture detection device has a plurality of operation zones in the interior, each of the operation zones being allocated to one of the functions and each of the operation zones are activatable to operate the respective function,
    wherein one of the respective operation zones is activated out of different locations of the interior of the vehicle while the person performs an activation gesture,
    wherein the respective function is operated after the respective operation zone is activated, and
    wherein the activation gesture is a universal gesture for activating each of the plurality of operation zones by pointing at the respective operation zone to be activated with a finger of a hand of the person.

2. The operation device of claim 1, wherein the finger is an index finger.

3. The operation device of claim 1, wherein the respectively activated operation zone remains activated as long as a wrist of the hand remains in a predetermined region after carrying out the gesture.

4. The operation device of claim 3, wherein the selected operation zone is deactivated by moving the wrist out of the predetermined region.

5. The operation device of claim 3, wherein the function allocated to the selected operation zone is operated by moving the hand and/or at least one finger of the hand while the wrist remains in the predetermined region.

6. A method, comprising:
    providing a plurality of operation zones in an interior of a vehicle, wherein each of the plurality of operation zones is assigned to a function of the vehicle, each of the plurality of operation zones is in a different location in the interior;
    activating one of the plurality of operation zones responsive to detection of an activation gesture, wherein the activation gesture is a universal gesture for activating each of the plurality of operation zones depending upon which one of the plurality of operation zones is pointed to by a finger of a hand of a person in the interior; and
    operating a function corresponding to the activated one of the plurality of operation zones after the activated one of the plurality of operation zones is activated.

7. The method of claim 6, wherein the finger is an index finger.

8. The method of claim 6, further comprising:
    maintaining the activation of the one of the plurality of operation zones so long as a wrist of the hand remains in a predetermined region after performing the gesture.

9. The method of claim 8, further comprising:
    deactivating the selected one of the plurality of operation zones when the wrist out of the predetermined region.

10. The operation device of claim 1, wherein the plurality of operation zones are arranged in different locations on a windshield of the vehicle.

11. The operation device of claim 10, wherein optical or acoustic feedback is provided responsive to activation of the respective operation zones.

12. The method of claim 6, wherein the plurality of operation zones are arranged in different locations on a windshield of the vehicle.

13. The method of claim 6, further comprising:
   providing optical or acoustic feedback responsive to activation of one of the plurality of operation zones.

* * * * *